United States Patent
Kayhani

(10) Patent No.: US 11,380,013 B2
(45) Date of Patent: Jul. 5, 2022

(54) SELF-INITIALIZING MACHINE VISION SENSORS

(71) Applicant: Cubic Corporation, San Diego, CA (US)

(72) Inventor: Niosha Kayhani, London (GB)

(73) Assignee: CUBIC CORPORATION, San Diego, CA (US)

( * ) Notice: Subject to any disclaimer, the term of this patent is extended or adjusted under 35 U.S.C. 154(b) by 132 days.

(21) Appl. No.: 16/998,230

(22) Filed: Aug. 20, 2020

(65) Prior Publication Data

US 2021/0056728 A1    Feb. 25, 2021

Related U.S. Application Data

(60) Provisional application No. 62/890,200, filed on Aug. 22, 2019.

(51) Int. Cl.
*H04N 5/232* (2006.01)
*G06T 7/80* (2017.01)

(52) U.S. Cl.
CPC ........... *G06T 7/80* (2017.01); *H04N 5/23241* (2013.01); *G06T 2207/30232* (2013.01)

(58) Field of Classification Search
CPC ............ G06T 7/80; G06T 2207/30232; H04N 5/23241; H04N 5/247; H04N 7/181; G08B 13/19641
See application file for complete search history.

(56) References Cited

U.S. PATENT DOCUMENTS

| | | |
|---|---|---|
| 2011/0211096 A1 | 9/2011 | Aagard |
| 2012/0307067 A1 | 12/2012 | Chen et al. |
| 2019/0238800 A1 | 8/2019 | Chuang et al. |
| 2019/0285748 A1* | 9/2019 | DeVries ................. G01S 17/04 |
| 2020/0001877 A1* | 1/2020 | Burca ............. B60W 30/18163 |

(Continued)

FOREIGN PATENT DOCUMENTS

| | | |
|---|---|---|
| WO | 2003/030550 A1 | 4/2003 |
| WO | 2007/032819 A2 | 3/2007 |

OTHER PUBLICATIONS

International Search Report and Written Opinion dated Nov. 27, 2020 in related application No. PCT/US2020/047115, all pgs.

(Continued)

*Primary Examiner* — Mekonnen D Dagnew
(74) *Attorney, Agent, or Firm* — Kilpatrick Townsend & Stockton LLP

(57) ABSTRACT

Techniques are disclosed for performing an initialization process for a set of FOV sensors using a set of initialization modules that are attachable to or integrated with the set of FOV sensors. A vertical distance associated with the set of FOV sensors is detected. An inter-module distance between a first initialization module and a second initialization module is detected. It is determined whether a placement of the second initialization module with respect to the first initialization module is acceptable based on the vertical distance and the inter-module distance. A feedback signal indicating whether the placement is acceptable is generated. The feedback signal is outputted at one or both of the first initialization module and the second initialization module.

20 Claims, 11 Drawing Sheets

(56) References Cited

U.S. PATENT DOCUMENTS

2021/0011170 A1* 1/2021 Hart .................. G01S 7/481

OTHER PUBLICATIONS

Sujan, V.A., "Optimum Camera Placement by Robot Teams in Unstructured Field Environments", International Conference on Image Processing (ICIP), IEEE., vol. 3. Sep. 22, 2002 (Sep. 22, 2002), pp. 861-864 XP010607854, DOI: 10.1109/ICIP.2002.1039108, ISBN: 978-0-7803-7622-9.

* cited by examiner

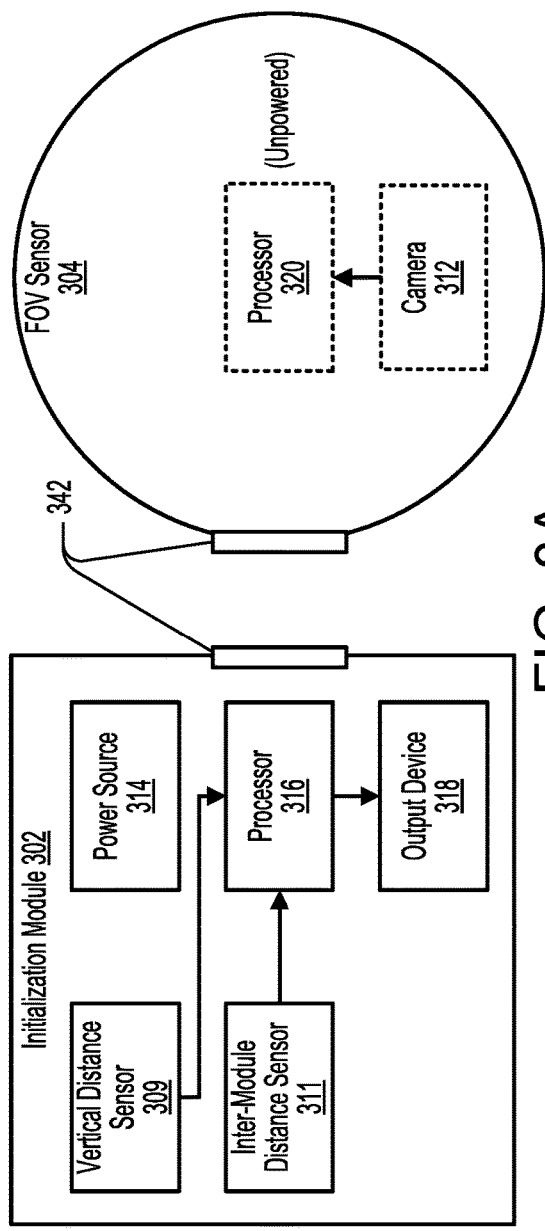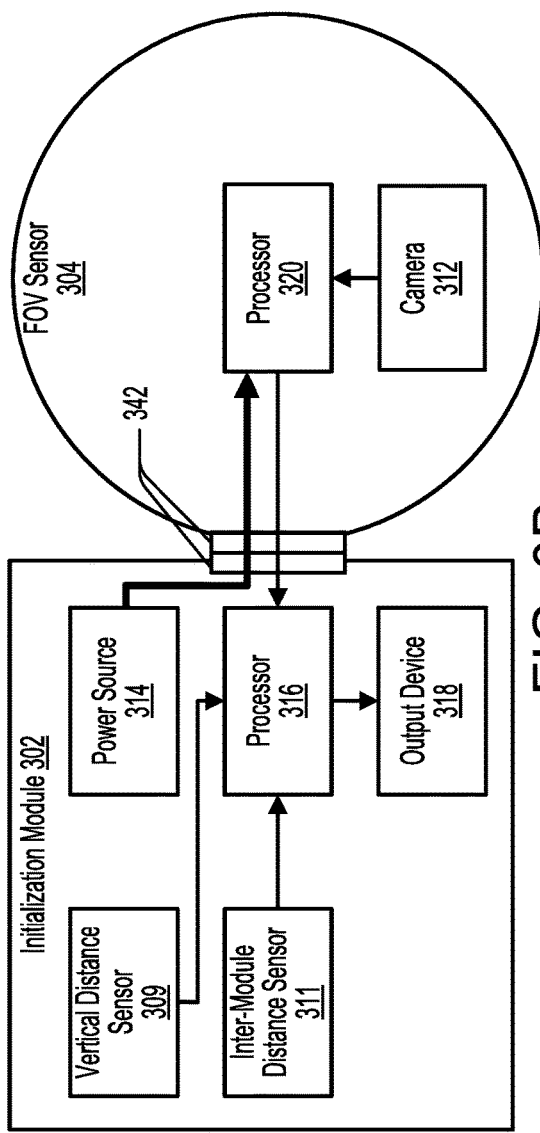
FIG. 3A
FIG. 3B

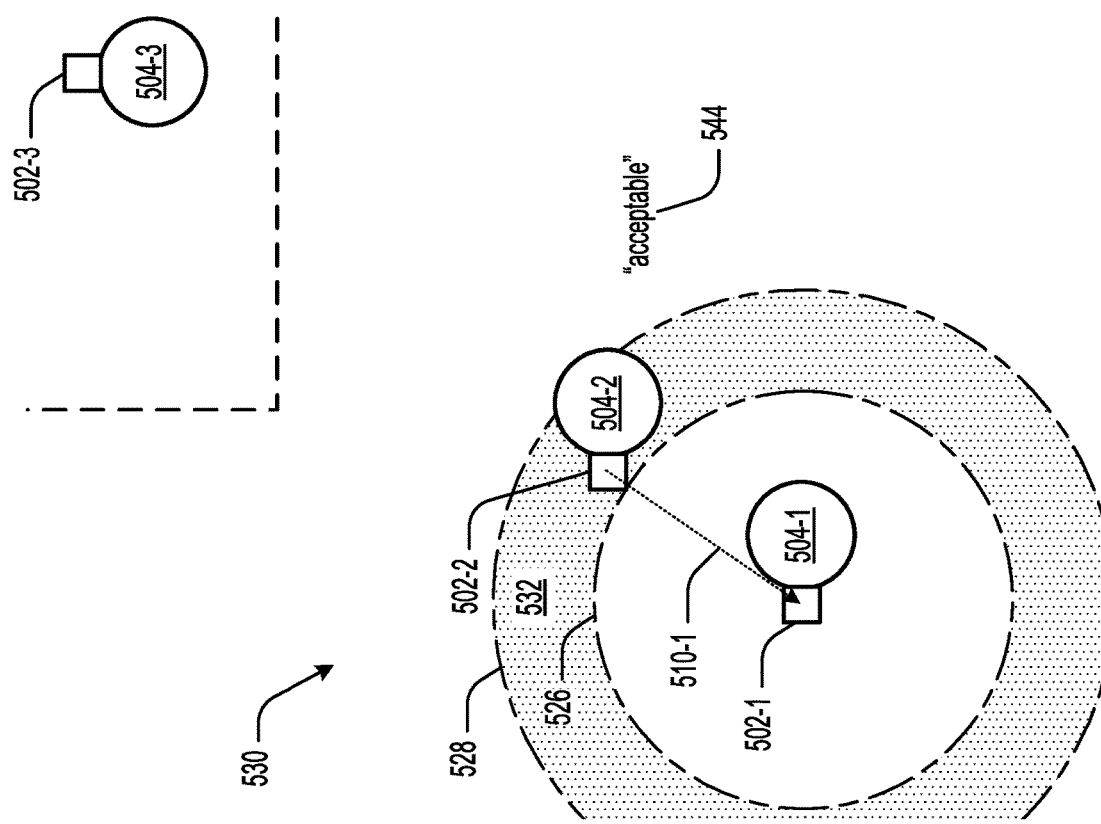
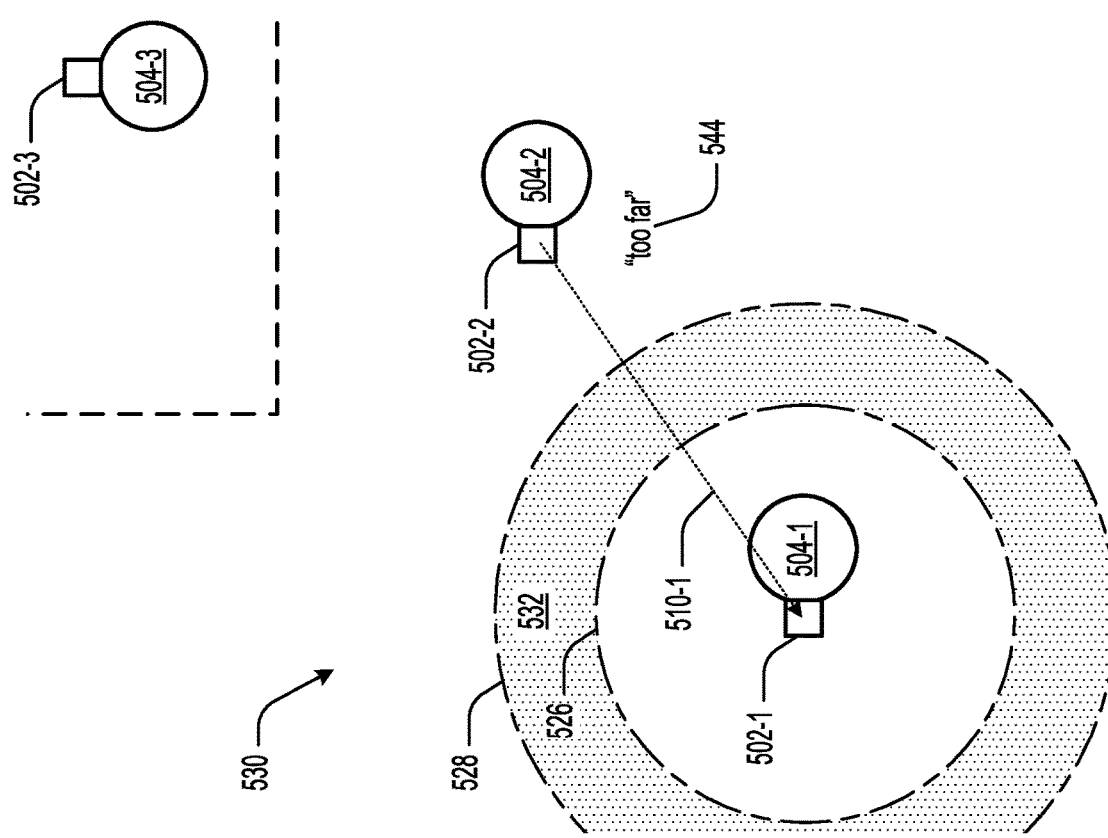

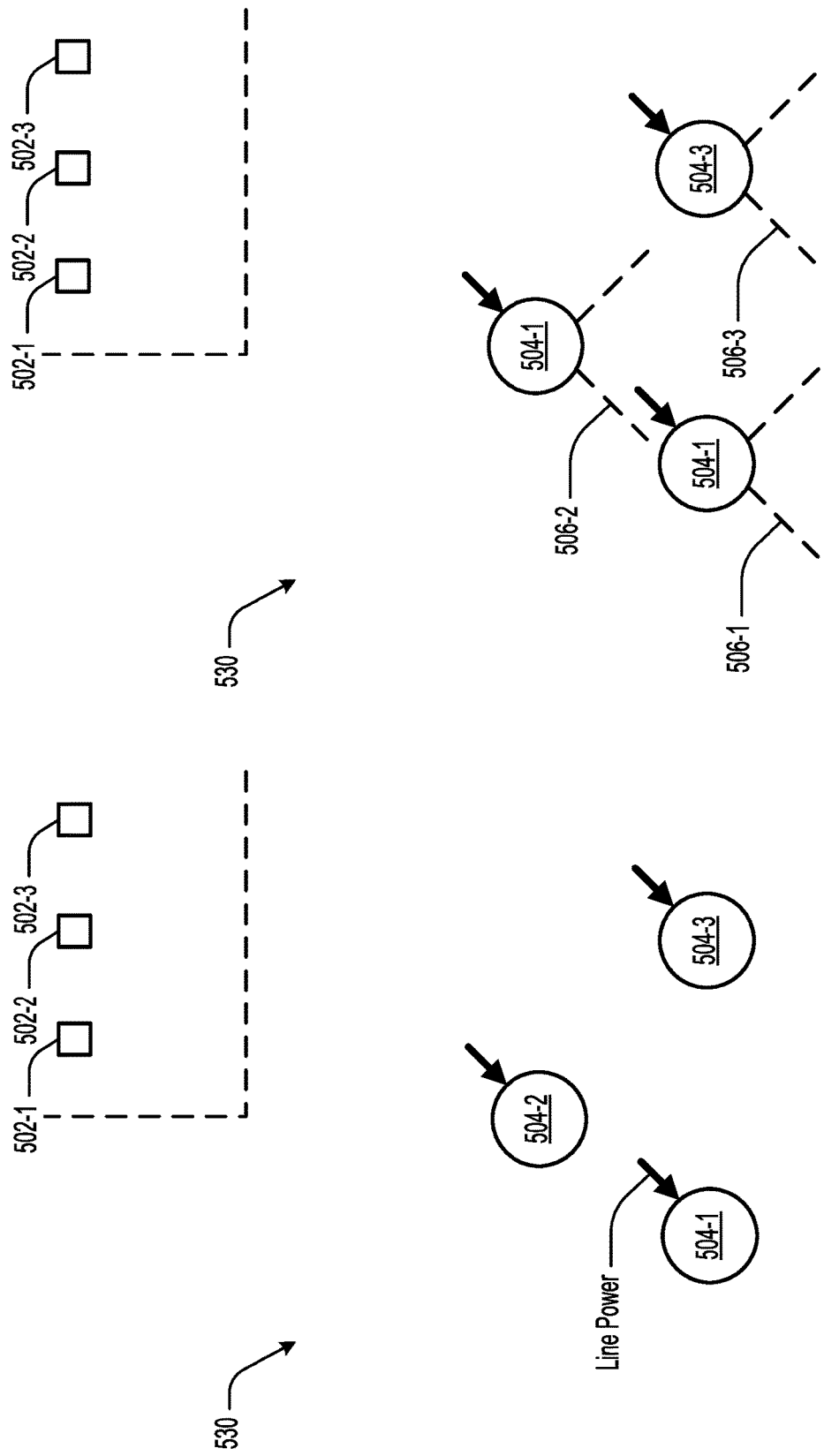

SELF-INITIALIZING MACHINE VISION SENSORS

CROSS-REFERENCES TO RELATED APPLICATIONS

This application claims the benefit of priority to U.S. Provisional Patent Application No. 62/890,200, filed Aug. 22, 2019, entitled "SELF-INITIALIZING MACHINE VISION SENSORS," the entire content of which is incorporated herein by reference for all purposes.

BACKGROUND OF THE INVENTION

Machine vision sensors, or simply vision sensors, can be used in a variety of applications, including object recognition and tracking. In transit applications, for example, machine vision sensors can be used to monitor crowd size and density to determine the needs and the efficacy of the transit system at various points of interest. Furthermore, networks of vision sensors can be used together to monitor a large area that may not fit within the field of view (FOV) of a single vision sensor. For example, multiple vision sensors may be located on a ceiling such that the FOV of each sensor overlaps with one or more other sensors to create a combined FOV capable of monitoring a long, narrow area of interest (e.g., hallway or tunnel).

BRIEF SUMMARY OF THE INVENTION

A summary of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of performing an initialization process for a set of field of view (FOV) sensors using a set of initialization modules attachable to or integrated with the set of FOV sensors, the method comprising: detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors; detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor; determining, at the first initialization module or the second initialization module, whether a placement of the second initialization module with respect to the first initialization module is acceptable based on the vertical distance and the inter-module distance; generating, at the first initialization module or the second initialization module, a feedback signal indicating whether the placement is acceptable; and outputting, at the first initialization module or the second initialization module, the feedback signal.

Example 2 is the method of example(s) 1, further comprising: determining that a start condition associated with the initialization process is satisfied.

Example 3 is the method of example(s) 2, wherein the start condition is that one or both of the first initialization module and the second initialization module has been powered on.

Example 4 is the method of example(s) 2, wherein the start condition is that one or both of the first initialization module and the second initialization module has received a user input.

Example 5 is the method of example(s) 1, wherein the set of initialization modules are attachable to the set of FOV sensors.

Example 6 is the method of example(s) 1, wherein the set of initialization modules are integrated with the set of FOV sensors.

Example 7 is the method of example(s) 1, wherein the set of FOV sensors are unpowered while the vertical distance and the inter-module distance are being detected and the feedback signal is being outputted.

Example 8 is a non-transitory computer-readable medium comprising instructions that, when executed by one or more processors, cause the one or more processors to perform operations for performing an initialization process for a set of field of view (FOV) sensors using a set of initialization modules, the operations comprising: detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors; detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor; determining, at the first initialization module or the second initialization module, whether a placement of the second initialization module with respect to the first initialization module is acceptable based on the vertical distance and the inter-module distance; generating, at the first initialization module or the second initialization module, a feedback signal indicating whether the placement is acceptable; and outputting, at the first initialization module or the second initialization module, the feedback signal.

Example 9 is the non-transitory computer-readable medium of example(s) 8, wherein the operations further comprise: determining that a start condition associated with the initialization process is satisfied.

Example 10 is the non-transitory computer-readable medium of example(s) 9, wherein the start condition is that one or both of the first initialization module and the second initialization module has been powered on.

Example 11 is the non-transitory computer-readable medium of example(s) 9, wherein the start condition is that one or both of the first initialization module and the second initialization module has received a user input.

Example 12 is the non-transitory computer-readable medium of example(s) 8, wherein the set of initialization modules are attachable to the set of FOV sensors.

Example 13 is the non-transitory computer-readable medium of example(s) 8, wherein the set of initialization modules are integrated with the set of FOV sensors.

Example 14 is the non-transitory computer-readable medium of example(s) 8, wherein the set of FOV sensors are unpowered while the vertical distance and the inter-module distance are being detected and the feedback signal is being outputted.

Example 15 is a system comprising: one or more processors; and a computer-readable medium comprising instructions that, when executed by the one or more processors, cause the one or more processors to perform operations for performing an initialization process for a set of field of view (FOV) sensors using a set of initialization modules, the operations comprising: detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors; detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor; determining, at the first initialization module or the second initialization module, whether a placement of the second initialization module with respect to the first initialization module is acceptable based on the vertical distance and the inter-module distance; generating, at the first initialization module or the second initialization module, a feedback signal indicating whether the placement is acceptable; and outputting, at the first initialization module or the second initialization module, the feedback signal.

Example 16 is the system of example(s) 15, wherein the operations further comprise: determining that a start condition associated with the initialization process is satisfied.

Example 17 is the system of example(s) 16, wherein the start condition is that one or both of the first initialization module and the second initialization module has been powered on.

Example 18 is the system of example(s) 16, wherein the start condition is that one or both of the first initialization module and the second initialization module has received a user input.

Example 19 is the system of example(s) 15, wherein the set of initialization modules are attachable to the set of FOV sensors.

Example 20 is the system of example(s) 15, wherein the set of initialization modules are integrated with the set of FOV sensors.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 3A and 3B illustrate examples of an initialization module that is attachable to an FOV sensor.

FIGS. 5A-5J illustrate various example steps for performing an initialization process for a set of FOV sensors at an installation site using a set of initialization modules.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the invention(s) described herein are generally related to self-initializing machine vision sensors in transit systems. That said, a person of ordinary skill in the art will understand that alternative embodiments may vary from the embodiments discussed herein, and embodiments of self-initializing machine vision sensors may be used in a variety of non-transit applications and are thus not limited to transit-related applications.

Figure 1:
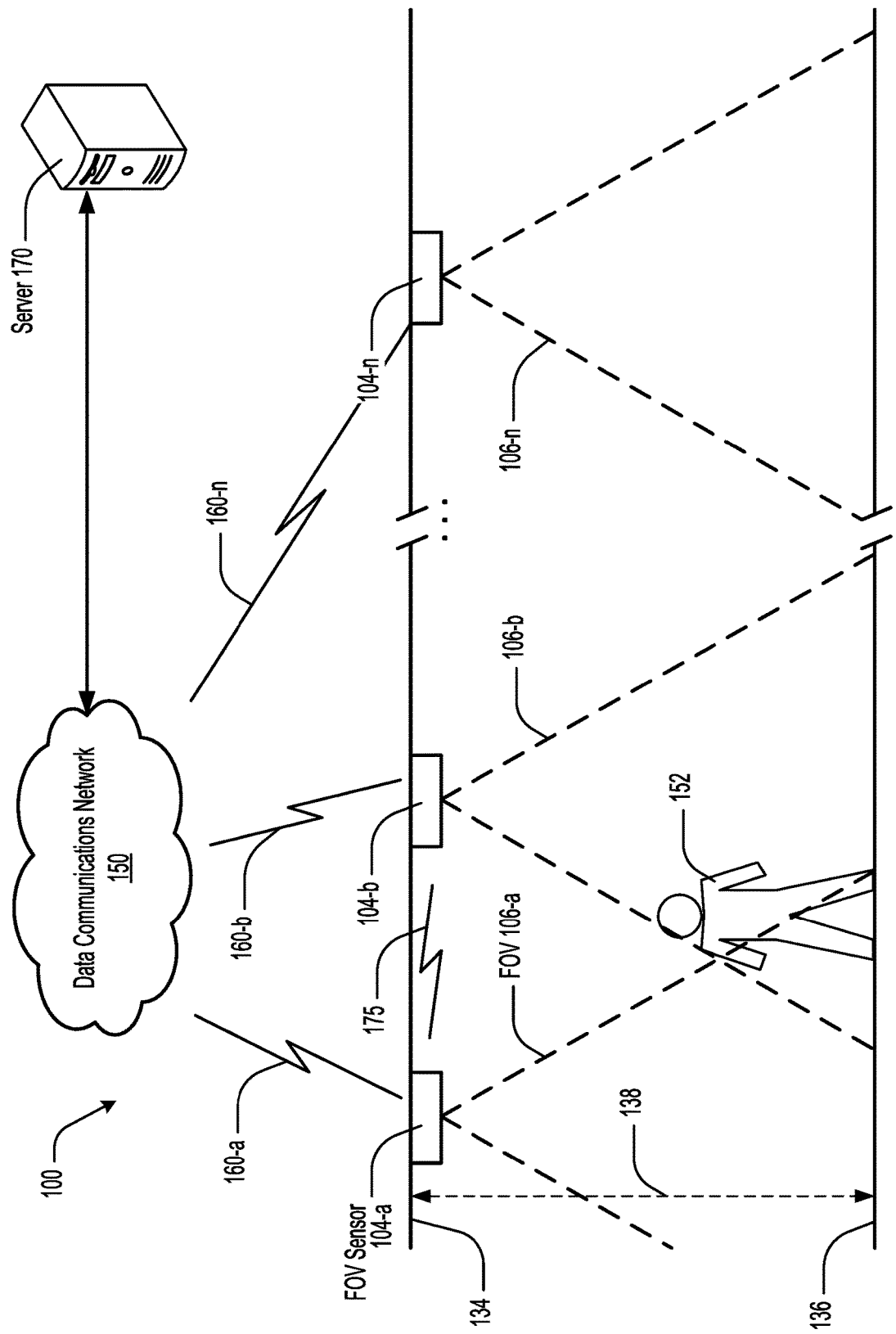
FIG. 1 illustrates an example of a machine vision system.

FIG. 1 illustrates an example of a machine vision system 100, according to some embodiments. In the illustrated example, machine vision system 100 comprises various sensors 104-$a$, 104-$b$, . . . , 104-$n$ having respective field of views (FOVs) 106-$a$, 106-$b$, . . . , 106-$n$. As such, sensors 104 may alternatively be referred to herein as FOV sensors 104. FOVs 106 may sufficiently overlap to ensure that a combined FOV is capable of monitoring one or more people (e.g. person 152) situated in a monitored area. It can be noted that some embodiments may allow for FOVs 106 of adjacent sensors 104 to, rather than overlap, be sufficiently adjacent to allow for object tracking from one FOV 106 to another. Here, FOV sensors 104 are mounted on a ceiling 134, which is located at a certain height 138 from a floor 136. FOV sensors 104 may communicate with a data communications network 150 via wireless signals 160, and data communications network 150 may be communicatively coupled with a server 170. When properly set up, server 170 will know the disposition of FOV sensors 104 with respect to one another and the monitored area to be able to track person 152 and/or other objects moving from the FOV of one sensor (e.g., FOV 106-$a$) to the FOV of another (e.g., FOV 106-$b$).

It will be understood that the embodiments of a machine vision system 100 illustrated in FIG. 1 is provided as a non-limiting example. Machine vision system 100 can have any number of FOV sensors 104 (e.g., more or fewer than illustrated in FIG. 1). Moreover, there may be any number of servers 170 communicatively coupled with FOV sensors 104 and the amount of people monitored by FOV sensors 104 can continuously vary. Furthermore, in practice, the area monitored by FOV sensors 104 can vary in shape and size, depending on the application. A person of ordinary skill in the art will understand that alternative embodiments may include these and/or other variations to the example illustrated in FIG. 1.

Set up and initialization of FOV sensors 104 according to traditional techniques can be difficult. Often times, set up according to these traditional techniques involves extensive planning prior to installation of FOV sensors 104 to ensure the area to be monitored falls within the combined FOV of FOV sensors 104. However, if an issue arises during installation that requires the sensor be installed at a location other than where previously planned (e.g., if a sprinkler, pipe, or other object on the ceiling prevents installation at the preplanned location), the entire setup can be disrupted, and installation locations for multiple FOV sensors 104 may need to be adjusted. One approach to increasing the combined FOV would be to add additional sensors to machine vision system 100. However, having more sensors is not only more expensive, but also costs more to install, and utilizes a higher amount of bandwidth, processing power, etc.

While FOV sensors 104 may be capable of transmitting inter-sensor wireless signals 175 (e.g., infrared (IR), radio frequency (RF), etc.) between each other for determining relative positions and orientations for purposes of proper installation, this may only be done after FOV sensors 104 have been secured to ceiling 134 and connected to line power. To reposition FOV sensors 104 after being powered, an installation crew may need to detach FOV sensors 104 from ceiling 134 and reattach them to different locations. Not only is this approach inefficient, but the installation crew may be unfamiliar and/or unauthorized to operate machine vision system 100.

Embodiments described herein address these and other issues by utilizing FOV sensors 104 that can be initialized through the use of multiple initialization modules that are attachable to or integrated with FOV sensors 104. The initialization modules may enable FOV sensors 104 to determine their location relative to each other (and the floor 136) without permanently securing FOV sensors 104 to ceiling 134 and/or connecting FOV sensors 104 to line power, providing for a simpler, more efficient deployment of FOV sensors 104.

Figure 2:
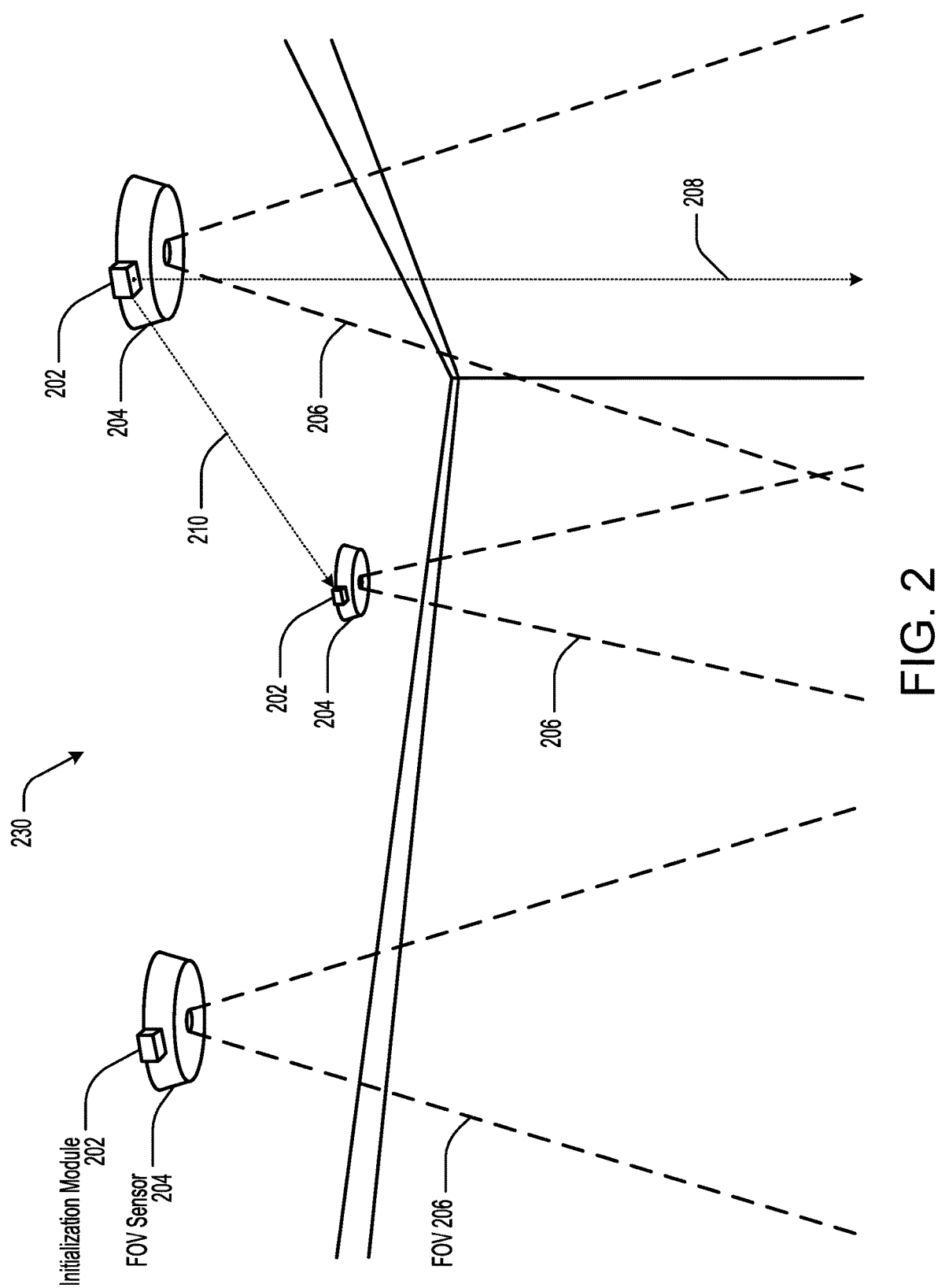
FIG. 2 illustrates an example of an installation site for installing multiple FOV sensors.

FIG. 2 illustrates an example of an installation site 230 at which multiple FOV sensors 204 are installed, according to some embodiments. In the illustrated example, a set of installation modules 202 are attached to FOV sensors 204 such that one installation module 202 is attached to each FOV sensor 204. In various embodiments, installation modules 202 may be used for performing an initialization process for FOV sensors 204. In some examples, an installation crew may arrive at installation site 230 and attach initialization modules 202 to FOV sensors 204. Next, the installation crew may temporarily position one or more FOV sensors 204 (along with the attached initialization modules 202) at various positions along the ceiling of installation site 230 using a temporary, non-permanent means of attachment (e.g., adhesives).

In some instances, FOV sensors 204 may be positioned sequentially such that the positioning of subsequent sensors are determined based on the positioning of previous sensors. For example, as described herein, a first FOV sensor may be positioned at an arbitrary first position, and a second FOV sensor may be positioned at a second position as assisted by initialization modules 202 based in part on the first position. Thereafter, a third FOV sensor may be positioned at a third position as assisted by initialization modules 202 based in part on the first position and the second position.

In some instances, one or more initialization modules 202 may detect a vertical distance 208 between a particular initialization module and the floor of installation site 230, such as a vertical distance between a first initialization module attached to the first FOV sensor and the floor and/or a vertical distance between a second initialization module attached to the second FOV sensor and the floor. Furthermore, one or more initialization modules 202 may detect an inter-module distance 210 between different initialization modules 202, such as a distance between the first initialization module attached to the first FOV sensor and the second initialization module attached to the second FOV sensor. The vertical distance and/or the inter-module distance may be used to determine the second position of the second FOV sensor, for example, by determining whether the second position is acceptable based on the vertical distance and/or the inter-module distance. Once the initialization process is complete, FOV sensors 204 are powered on and are caused to capture data (e.g., video and/or images) within FOVs 206 using downward-facing cameras.

FIGS. 3A and 3B illustrate examples of an initialization module 302 that is attachable to an FOV sensor 304, according to some embodiments. FIG. 3A shows initialization module 302 and FOV sensor 304 separated, for example, prior to attachment or subsequent to detachment, and FIG. 3B shows initialization module 302 attached to FOV sensor 304. In the illustrated example, initialization module 302 includes a processor 316, a power source 314, a vertical distance sensor 309, an inter-module distance sensor 311, and an output device 318. Power source 314 may include one or more batteries or other powering means and may provide electrical power to each of the components of initialization module 302. For example, processor 316 may receive electrical power from power source 314 so that processor 316 may perform various operations during the initialization process.

During the initialization process, vertical distance sensor 309 may be configured to detect a vertical distance associated with initialization module 302 and/or FOV sensor 304. For example, the vertical distance may be the distance between the vertical distance sensor 309 and the floor of the installation site. As such, vertical distance sensor 309 may be configured to face downward when initialization module 302 is attached to FOV sensor 304. In some implementations, vertical distance sensor 309 may be a time-of-flight sensor that measures distance based on the time difference between the emission of a signal and its return to the sensor. Such a sensor may employ sound signals (e.g., ultrasound), optical signals (e.g., lidar), or electrical signals (e.g., radar), among other possibilities.

Further during the initialization process, inter-module distance sensor 311 may be configured to detect an inter-module distance between initialization module 302 and a second initialization module attached to a second FOV sensor. For example, the inter-module distance may be the distance between initialization module 302 and the second initialization module. The inter-module distance may be a horizontal distance or, in some embodiments, may include a vertical component in addition to the horizontal component. Similar to vertical distance sensor 309, inter-module distance sensor 311 may be a time-of-flight sensor and may employ sound signals (e.g., sonar, ultrasound), optical signals (e.g., lidar), or electrical signals (e.g., radar), among other possibilities.

In some implementations, inter-module distance sensor 311 may include a radio frequency (RF) transceiver (e.g., an ultra-wideband (UWB) transceiver), which can be used for distance determination and/or radio frequency (RF) communication. In some embodiments, initialization modules may be capable of using the RF transceivers to determine the inter-module distance between sensors by taking distance-related measurements. These distance-related measurements can include, for example, Round-Trip Time (RTT) measurements, Received Signal Strength Indicator (RSSI) measurements, and/or similar measurements. In some embodiments, each initialization module may communicate a unique identifier for the sensor in order to identify it among the initialization modules during distance determination. In addition or as an alternative to a UWB transceiver, embodiments may additionally or alternatively include RF transceivers capable of communicating using any of a variety of wireless technologies, including, for example, BLUETOOTH, Wi-Fi, ZIGBEE, and/or the like. According to some embodiments, sensors 104 may be capable of determining distance 210 to meter-level, decimeter-level, or centimeter-level accuracy. That said, other embodiments may be capable of determining a more accurate distance, for example, down to millimeter-level accuracy.

Further during the initialization process, output device 318 may be configured to output a feedback signal that indicates whether a placement or positioning of initialization module 302 is acceptable. The feedback signal may be generated by processor 316 by analyzing, for example, the vertical distance and/or one or more inter-module distances. In some embodiments, the feedback signal may be binary, indicating either an acceptable or unacceptable placement of initialization module 302. In some embodiments, the feedback signal may provide additional information, such as, for example, a level of accuracy of the placement and/or directives as to which direction initialization module 302 and or FOV sensor 304 should be moved or repositioned to result in an acceptable placement or a more acceptable/accurate placement.

In some implementations, output device 318 may include a combination of light-emitting diodes (LEDs) for outputting the feedback signal to the installation crew. The LEDs may utilize different colors, frequencies, and/or patterns (spatial and/or temporal) to communicate a variety of information. For example, a green LED may indicate an acceptable placement whereas a red LED may indicate an unacceptable placement. As another example, the LEDs may indicate that the initialization modules are within adequate range of each other (e.g., given the installation height) in any of a variety of ways. In some embodiments, each color indicates a different status of initialization module 302 (e.g., whether initialization module 302 is within range of the other initialization modules, and/or whether the amount of coverage is "very good," "good," or "adequate"). Additionally or alternatively, output device 318 may include a display or audio speaker for relaying such information to a user during installation.

In some embodiments, initialization modules 302 can form an ad-hoc or mesh network in which initialization modules 302 are able to communicate with each other without the need to communicate via a data communications network. That said, in some embodiments, initialization modules 302 may communicate with each other during the initialization process via the data communications network. In some embodiments, two initialization modules can begin the process of determining their distance from one another once a communication link (e.g., ad hoc/mesh network link) has been established. In other embodiments, buttons on the initialization modules themselves and/or communication with an in-field set up device may be used as an additional or alternative trigger for starting the initialization process.

In some embodiments, a user may utilize an in-field setup device (e.g., a mobile electronic device, such as a mobile phone, tablet, etc.), which may be able to communicate with the initialization module 302 via a set of wireless signals. This can allow the initialization module 302 to communicate status information to the in-field setup device via output device 318 (e.g., in addition or as an alternative to information relayed by an LED or display, as described above), allowing a user installing the FOV sensors to receive real-time status information during setup.

In some embodiments, initialization module 302 may provide temporary electrical power to FOV sensor 304 while initialization module 302 and FOV sensor 304 are attached via connection interfaces 342. For example, when attached, connection interfaces 342 may form a conductive path between power source 314 and a processor 320 and/or a camera 312 of FOV sensor 304. In response to receiving electrical power from power source 314, processor 320 may provide sensor information to processor 316. The sensor information may include a type of camera 312, a size of the FOV of camera 312, and orientation of camera 312, or a setting of camera 312, among other possibilities. In some embodiments, the sensor information may include an image captured by camera 312. For example, FOV sensor 304 may be sufficiently powered by power source 314 such that camera 312 is able to capture an image within its FOV and pass the image to processor 316. In some embodiments, the vertical distance may be detected using the captured image such that camera 312 functions as vertical distance sensor 309. As illustrated in FIG. 3A, elements of FOV sensor 304 are otherwise unpowered during the initialization process when not receiving electrical power from power source 314.

Figure 4B:
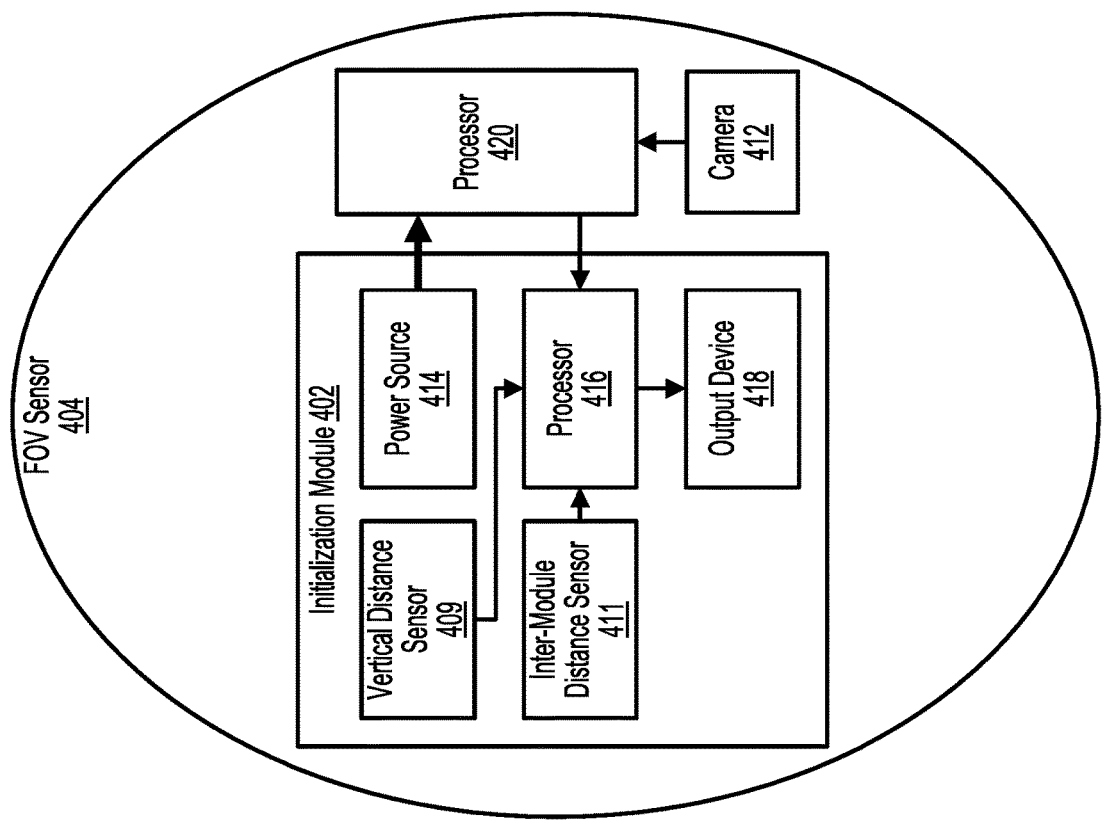
FIGS. 4A and 4B illustrate examples of an initialization module that is integrated with an FOV sensor.
Figure 4A:
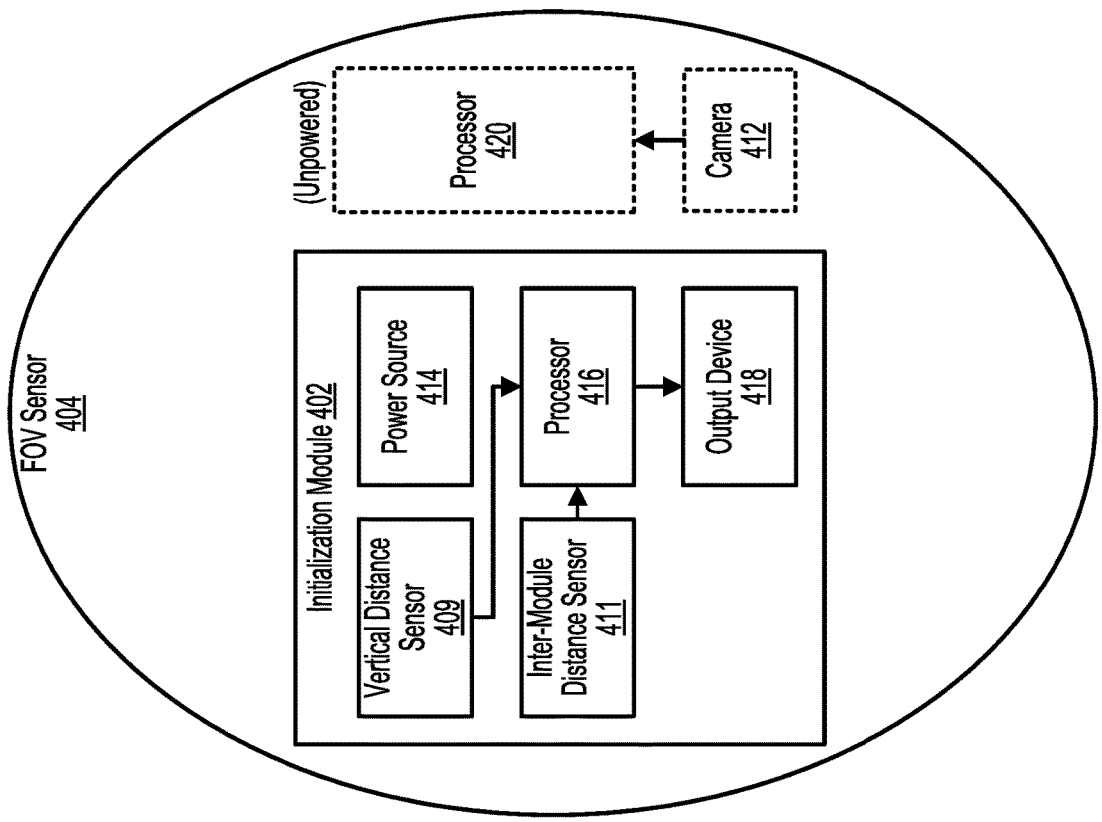

FIGS. 4A and 4B illustrate examples of an initialization module 402 that is integrated with an FOV sensor 404, according to some embodiments. In the illustrated example, initialization module 402 includes a processor 416, a power source 414, a vertical distance sensor 409, an inter-module distance sensor 411, and an output device 418. Power source 414 may include one or more batteries or other powering means and may provide electrical power to each of the components of initialization module 402.

Elements of initialization module 402 may have similar functionality to similarly-labeled elements of initialization modules described herein, such as initialization module 302. For example, during the initialization process, vertical distance sensor 409 may be configured to detect a vertical distance associated with initialization module 402 and/or FOV sensor 404, inter-module distance sensor 411 may be configured to detect an inter-module distance between initialization module 402 and one or more other initialization modules, and output device 418 may be configured to output a feedback signal that indicates whether a placement or positioning of initialization module 402 is acceptable.

In some embodiments, initialization module 402 may provide temporary electrical power to elements of FOV sensor 404 outside of initialization module 402. For example, power source 414 may provide electrical power to a processor 420 and/or a camera 412 of FOV sensor 404. In response to receiving electrical power from power source 414, processor 420 may provide sensor information to processor 416. The sensor information may include a type of camera 412, a size of the FOV of camera 412, and orientation of camera 412, or a setting of camera 412, among other possibilities. In some embodiments, the sensor information may include an image captured by camera 412. For example, FOV sensor 404 may be sufficiently powered by power source 414 such that camera 412 is able to capture an image within its FOV and pass the image to processor 416. In some embodiments, the vertical distance may be detected using the captured image such that camera 412 functions as vertical distance sensor 409. As illustrated in FIG. 4A, elements of FOV sensor 404 are otherwise unpowered during the initialization process when not receiving electrical power from power source 414.

Figures 5A, 5B:
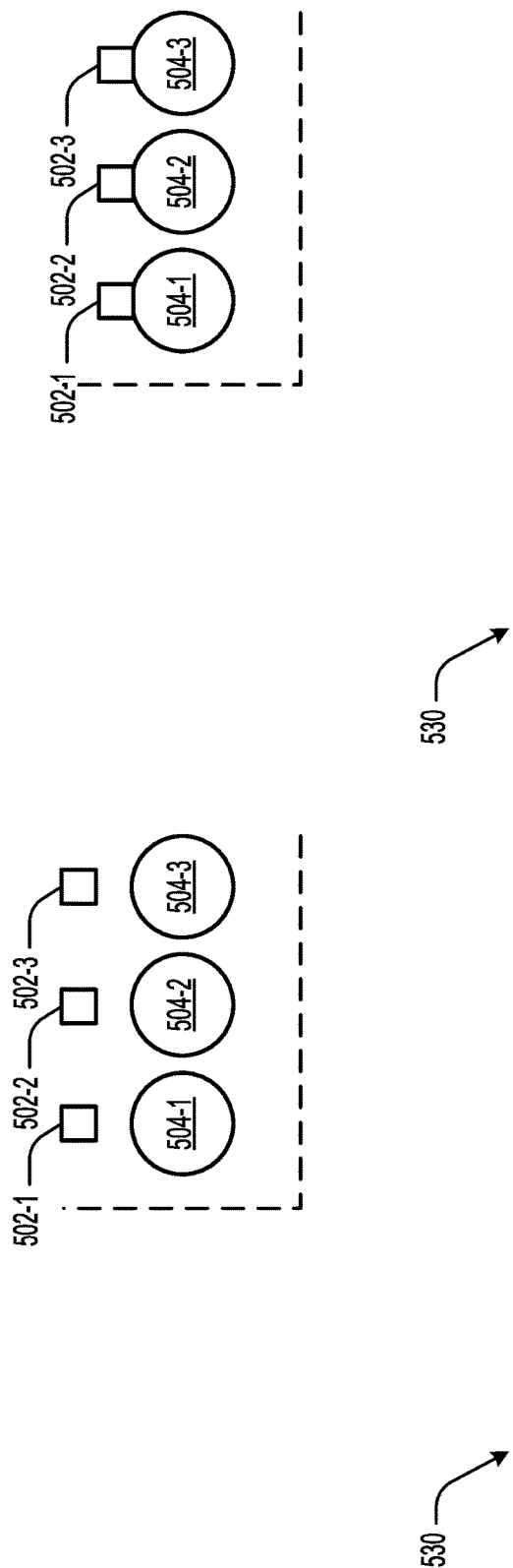

FIGS. 5A-5J illustrate various example steps for performing an initialization process for a set of FOV sensors 504 using a set of initialization modules 502, according to some embodiments. In the illustrated example, FOV sensors 504 are to be installed at an installation site 530. In FIG. 5A, initialization modules 502 and FOV sensors 504 are brought to installation site 530. In some embodiments, initialization modules 502 may be packaged separately from FOV sensors 504 (e.g., as a separately sold product) or, in some embodiments, initialization modules 502 may be included in a packaging that includes FOV sensors 504. In FIG. 5B, initialization modules 502 are attached to FOV sensors 504. For example, initialization modules 502 may be temporarily attached to FOV sensors 504 using a temporary means of attachment.

Figure 5D:
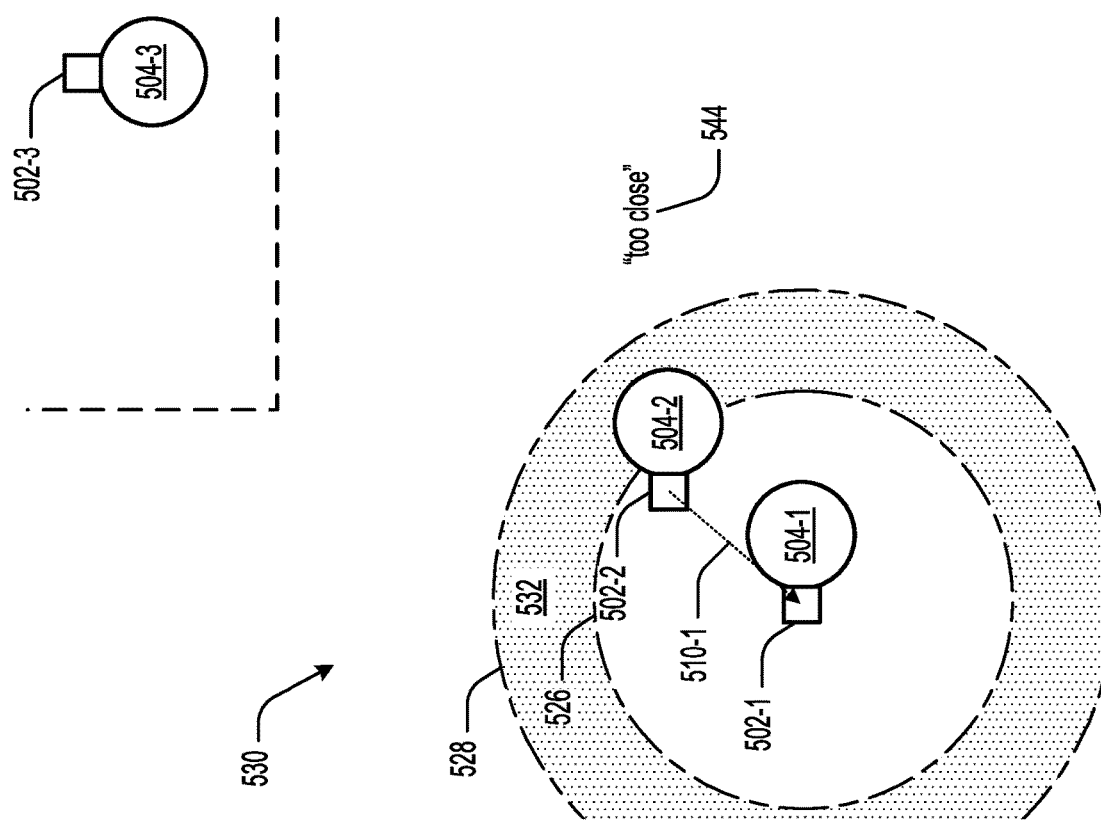
Figure 5C:
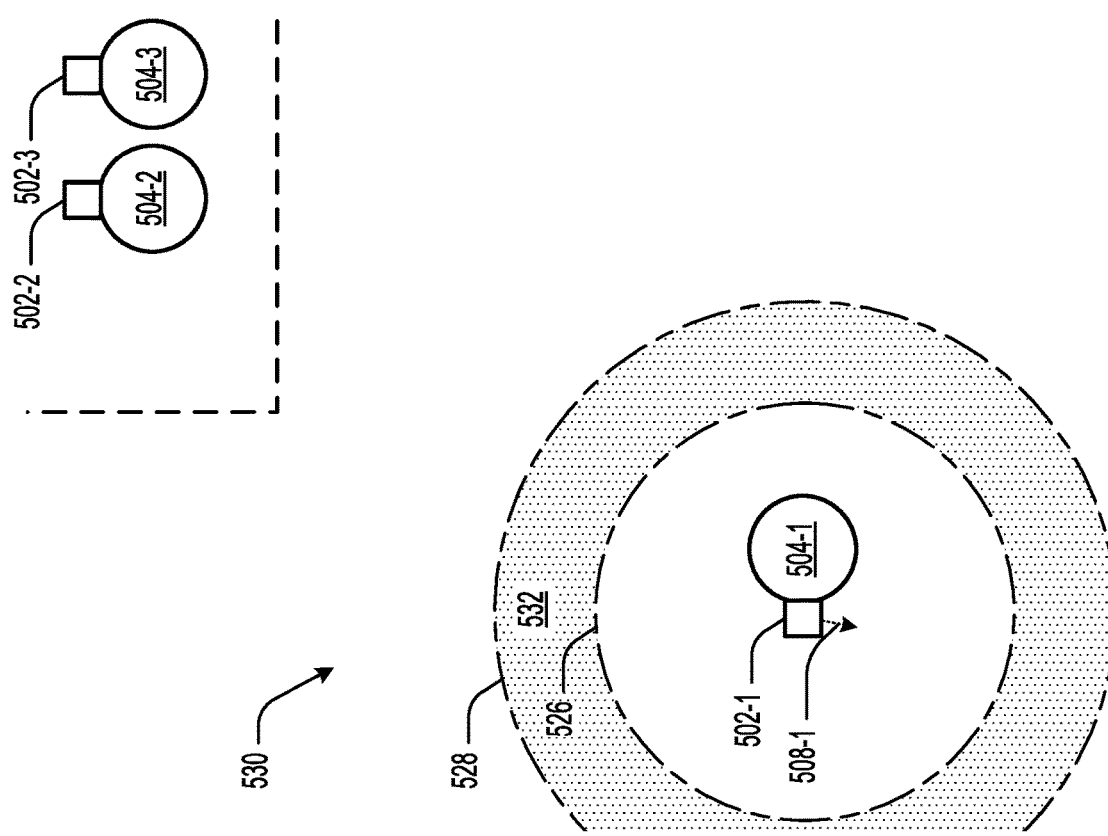

In FIG. 5C, a first FOV sensor 504-1 and a first initialization module 502-1 are placed at a first position along the ceiling of installation site 530. A vertical distance sensor of the first initialization module 502-1 may detect a first vertical distance 508-1 between the first initialization module 502-1 and the ground of installation site 530. In some embodiments, an acceptable zone 532 may be established based on the first vertical distance 508-1. Acceptable zone 532 may be defined by a minimum threshold 526 and a maximum threshold 528. Each of minimum threshold 526 and maximum threshold 528 may be determined based on the first vertical distance 508-1, such that, for example, larger vertical distances corresponds to larger values for minimum threshold 526 and maximum threshold 528 (since the FOV of the first FOV sensor 504-1 is expected to cover a larger area along the floor of installation site 530 for higher vertical placements).

In FIG. 5D, a second FOV sensor 504-2 and a second initialization module 502-2 are placed along the ceiling at installation site 530. Using the inter-module distance sensor(s) of the first initialization module 502-1 and/or the second initialization module 502-2, a first inter-module distance 510-1 between the first initialization module 502-1 and the second initialization module 502-2 is detected. Based on the first inter-module distance 510-1 and acceptable zone 532, it is determined that the placement of the second FOV sensor 504-2 and the second initialization module 502-2 with respect to the first FOV sensor 504-1 and the first initialization module 502-1 is not acceptable. For example, it may be determined that the position of the second initialization module 502-2 lies outside of acceptable zone 532 by determining that the first inter-module distance 510-1 is less than minimum threshold 526. As a result, the first initialization module 502-1 and/or the second initialization module 502-2 may output a feedback signal 544 indicating that the second FOV sensor 504-2 and the second initialization module 502-2 are too close to the first FOV sensor 504-1 and the first initialization module 502-1 (e.g., feedback signal 544 may include an audio or visual signal specifying "too close").

In FIG. 5E, the second FOV sensor 504-2 and the second initialization module 502-2 are repositioned along the ceiling at installation site 530. Using the inter-module distance sensor(s) of the first initialization module 502-1 and/or the second initialization module 502-2, a new first inter-module distance 510-1 between the first initialization module 502-1 and the second initialization module 502-2 is detected. Based on the first inter-module distance 510-1 and acceptable zone 532, it is determined that the placement of the second FOV sensor 504-2 and the second initialization module 502-2 is not acceptable. For example, it may be determined that the position of the second initialization module 502-2 lies outside of acceptable zone 532 by determining that the first inter-module distance 510-1 is greater than maximum threshold 528. As a result, the first initialization module 502-1 and/or the second initialization module 502-2 may output a feedback signal 544 indicating that the second FOV sensor 504-2 and the second initialization module 502-2 are too far from the first FOV sensor 504-1 and the first initialization module 502-1 (e.g., feedback signal 544 may include an audio or visual signal specifying "too far").

In FIG. 5F, the second FOV sensor 504-2 and the second initialization module 502-2 are repositioned along the ceiling at installation site 530. Using the inter-module distance sensor(s) of the first initialization module 502-1 and/or the second initialization module 502-2, a new first inter-module distance 510-1 between the first initialization module 502-1 and the second initialization module 502-2 is detected. Based on the first inter-module distance 510-1 and acceptable zone 532, it is determined that the placement of the second FOV sensor 504-2 and the second initialization module 502-2 is acceptable. For example, it may be determined that the position of the second initialization module 502-2 lies within acceptable zone 532 by determining that the first inter-module distance 510-1 is greater than minimum threshold 526 and less than maximum threshold 528. As a result, the first initialization module 502-1 and/or the second initialization module 502-2 may output a feedback signal 544 indicating that the placement of the second FOV sensor 504-2 and the second initialization module 502-2 is acceptable (e.g., feedback signal 544 may include an audio or visual signal specifying "acceptable").

Figure 5H:
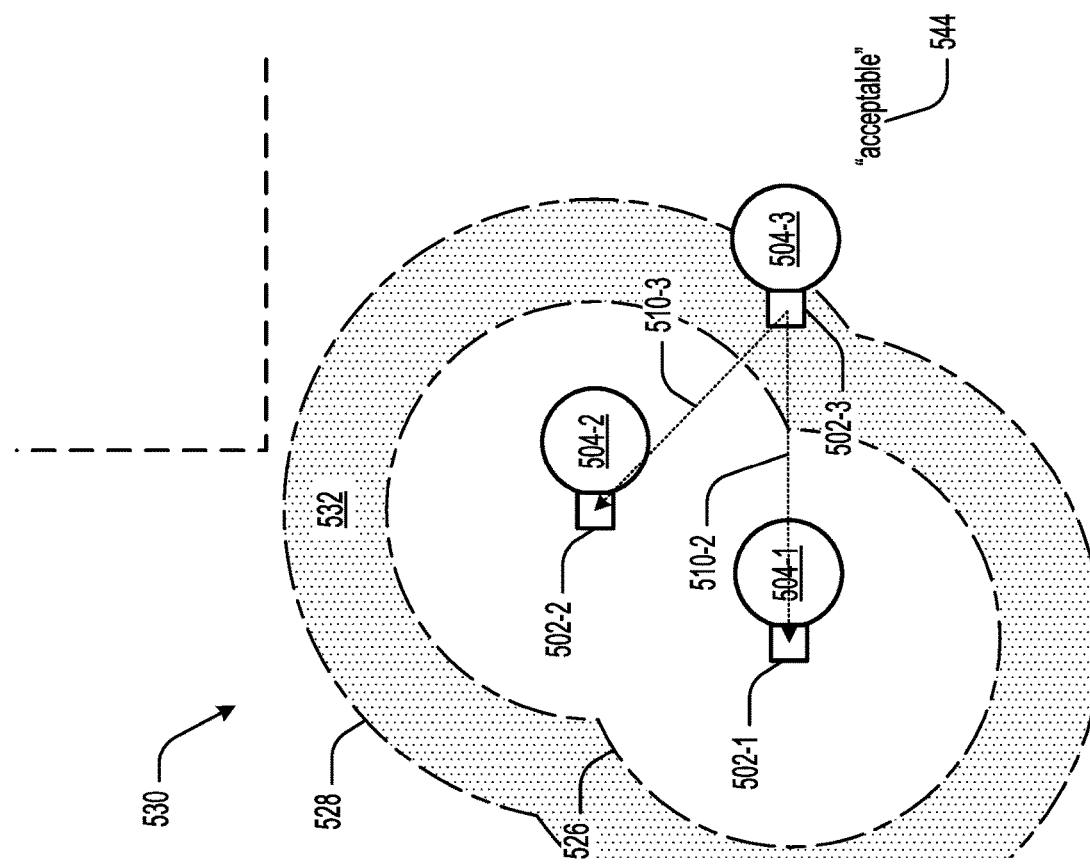
Figure 5G:
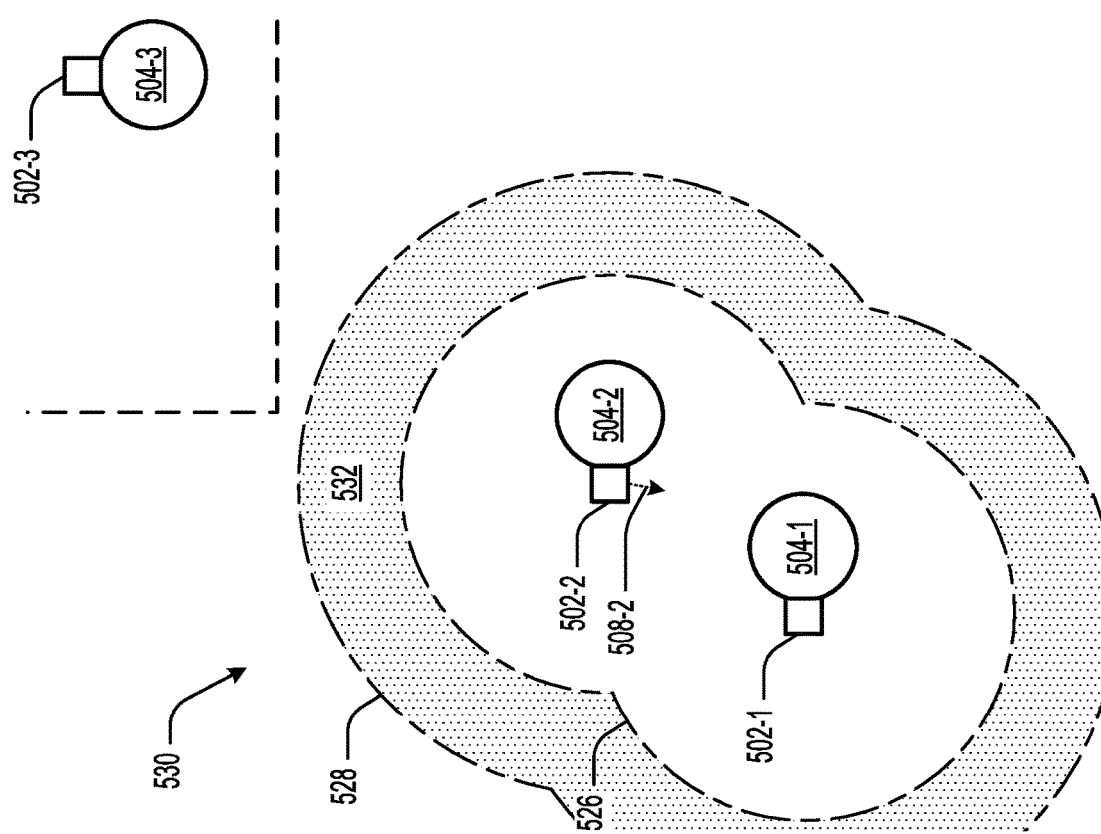

In FIG. 5G, a vertical distance sensor of the second initialization module 502-2 may detect a second vertical distance 508-2 between the second initialization module 502-2 and the ground of installation site 530. Acceptable zone 532 may be reestablished based on the first vertical distance 508-1 and/or the second vertical distance 508-2, the position of the first initialization module 502-1, and the position of the second initialization module 502-2. Acceptable zone 532 may be defined by minimum threshold 526 (e.g., corresponding to a minimum distance from each of the first initialization module 502-1 and the second initialization module 502-2) and a maximum threshold 528 (e.g., corresponding to a maximum distance from each of the first initialization module 502-1 and the second initialization module 502-2). In some embodiments, the second vertical distance 508-2 need not be detected. Instead, the first vertical distance 508-1 can be used as the vertical height for all initialization modules.

In FIG. 5H, a third FOV sensor 504-3 and a third initialization module 502-3 are placed along the ceiling at installation site 530. Using the inter-module distance sensor(s) of the first initialization module 502-1 and/or the third initialization module 502-3, a second inter-module distance 510-2 between the first initialization module 502-1 and the third initialization module 502-3 is detected. Using the inter-module distance sensor(s) of the second initialization module 502-2 and/or the third initialization module 502-3, a third inter-module distance 510-3 between the second initialization module 502-2 and the third initialization module 502-3 is detected. Based on the second inter-module distance 510-2, the third inter-module distance 510-3, and acceptable zone 532, it is determined that the placement of the third FOV sensor 504-3 and the third initialization module 502-3 is acceptable. As a result, the first initialization module 502-1, the second initialization module 502-2, and/or the third initialization module 502-3 may output a feedback signal 544 indicating that the placement of the third FOV sensor 504-3 and the third initialization module 502-3 is acceptable (e.g., feedback signal 544 may include an audio or visual signal specifying "acceptable").

In FIG. 5I, initialization modules 502 are detached from FOV sensors 504. Additionally, FOV sensors 504 may be connected to line power and attached to the ceiling at installation site 530 in a more permanent manner (e.g., by fastening using screws, washers, bolts, nuts, etc.). In some embodiments, FOV sensors 504 may receive electrical power using a Power over Ethernet (PoE) configuration. In FIG. 5J, FOV sensors 504 are powered on and are caused to capture data within FOVs 506.

Figure 6:
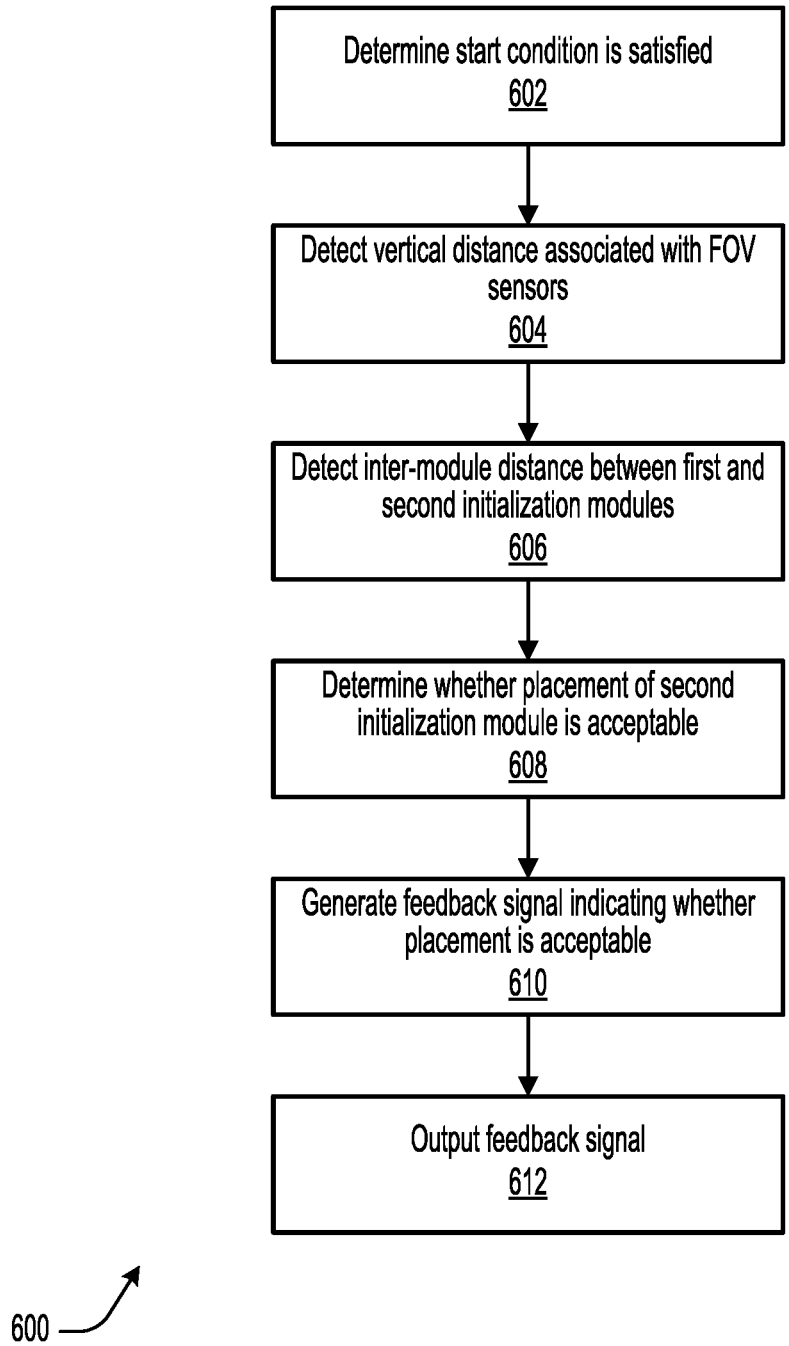
FIG. 6 illustrates an example of a method of performing an initialization process for a set of FOV sensors using a set of initialization modules.

FIG. 6 illustrates an example of a method 600 of performing an initialization process for a set of FOV sensors (e.g., FOV sensors 104, 204, 304, 404, 504) using a set of initialization modules (e.g., initialization modules 202, 302, 402, 502) that are attachable to or integrated with the set of FOV sensors, according to some embodiments. The set of FOV sensors may include a first FOV sensor, a second FOV sensor, and a third FOV sensor. The set of initialization modules may include a first initialization module, a second initialization module, and a third initialization module. One or more steps of method 600 may be performed at an installation site (e.g., installation sites 230, 530), for example, by devices positioned along a ceiling (e.g., ceiling 134) at the installation site. One or more steps of method 600 may be performed while the set of FOV sensors are unpowered.

One or more steps of method 600 may be omitted during performance of method 600, and steps of method 600 need not be performed in the order shown. One or more steps of method 600 may be performed by one or more processors (e.g, processors 316, 416 or processors 320, 420). Method 600 may be implemented as a computer-readable medium or computer program product comprising instructions which, when the program is executed by one or more computers, cause the one or more computers to carry out the steps of method 600. Such computer program products can be transmitted, over a wired or wireless network, in a data carrier signal carrying the computer program product.

At step 602, it is determined that a start condition associated with the initialization process is satisfied. In some embodiments, the start condition is that one or both of the first initialization module and the second initialization module have been powered on. In some embodiments, the start condition is that one or both of the first initialization module and the second initialization module has received a user input. For example, a user may press a button, flip a switch, or otherwise activate an input device located on the first initialization module or the second initialization module. In some embodiments, the start condition is that wireless communication between the first initialization module and the second initialization module has been established.

At step 604, a vertical distance (e.g., vertical distances 208, 508) associated with the set of FOV sensors is detected. In some embodiments, the vertical distance may be detected using a vertical distance sensor (e.g., vertical distance sensors 309, 409) of the first initialization module. In some embodiments, the vertical distance may be detected using a vertical distance sensor of the second initialization module. In some embodiments, the vertical distance may be detected while the first initialization module is attached to or integrated with the first FOV sensor or the second initialization module is attached to or integrated with the second FOV sensor. In some embodiments, the vertical distance may be a first vertical distance corresponding to a vertical height of the first initialization module or a second vertical distance corresponding to a vertical height of the second initialization module.

At step 606, an inter-module distance (e.g., inter-module distances 210, 510) between the first initialization module and the second initialization module is detected. In some embodiments, the inter-module distance may be detected using an inter-module distance sensor (e.g., inter-module distance sensors 311, 411) of the first initialization module or the second initialization module. In some embodiments, the inter-module distance may be detected using two inter-module distance sensors: a first inter-module distance sensor of the first initialization module and a second inter-module distance sensor of the second initialization module.

At step 608, it is determined whether a placement of the second initialization module with respect to the first initialization module is acceptable based on the vertical distance and the inter-module distance. In some embodiments, it is determined whether a position of the second initialization module lies within an acceptable zone (e.g., acceptable zone 532). In some embodiments, determining whether the position of the second initialization module lies within the acceptable zone includes comparing the inter-module distance to a minimum threshold (e.g., minimum threshold 526) and or a maximum threshold (e.g., maximum threshold 528). In some embodiments, the acceptable zone, the minimum threshold, and the maximum threshold are determined based on the vertical distance. In some embodiments, step 608 includes first determining one or more thresholds (e.g., the minimum threshold and/or the maximum threshold) based on the vertical distance, and second comparing the inter-module distance to the one or more thresholds. In some embodiments, the operations for determining whether the placement is acceptable are performed at one or more processors of the first initialization module or the second initialization module.

At step 610, a feedback signal (e.g., feedback signal 544) indicating whether the placement of the second initialization module with respect to the first initialization module is acceptable is generated. In some embodiments the feedback signal is generated at the one or more processors of the first initialization module or the second initialization module.

At step 612, the feedback signal is outputted. In some embodiments the feedback signal is outputted at the first initialization module or the second initialization module. In some embodiments, the feedback signal is outputted by an output device (e.g., output devices 318, 418) of the first initialization module or the second initialization module.

Figure 7:
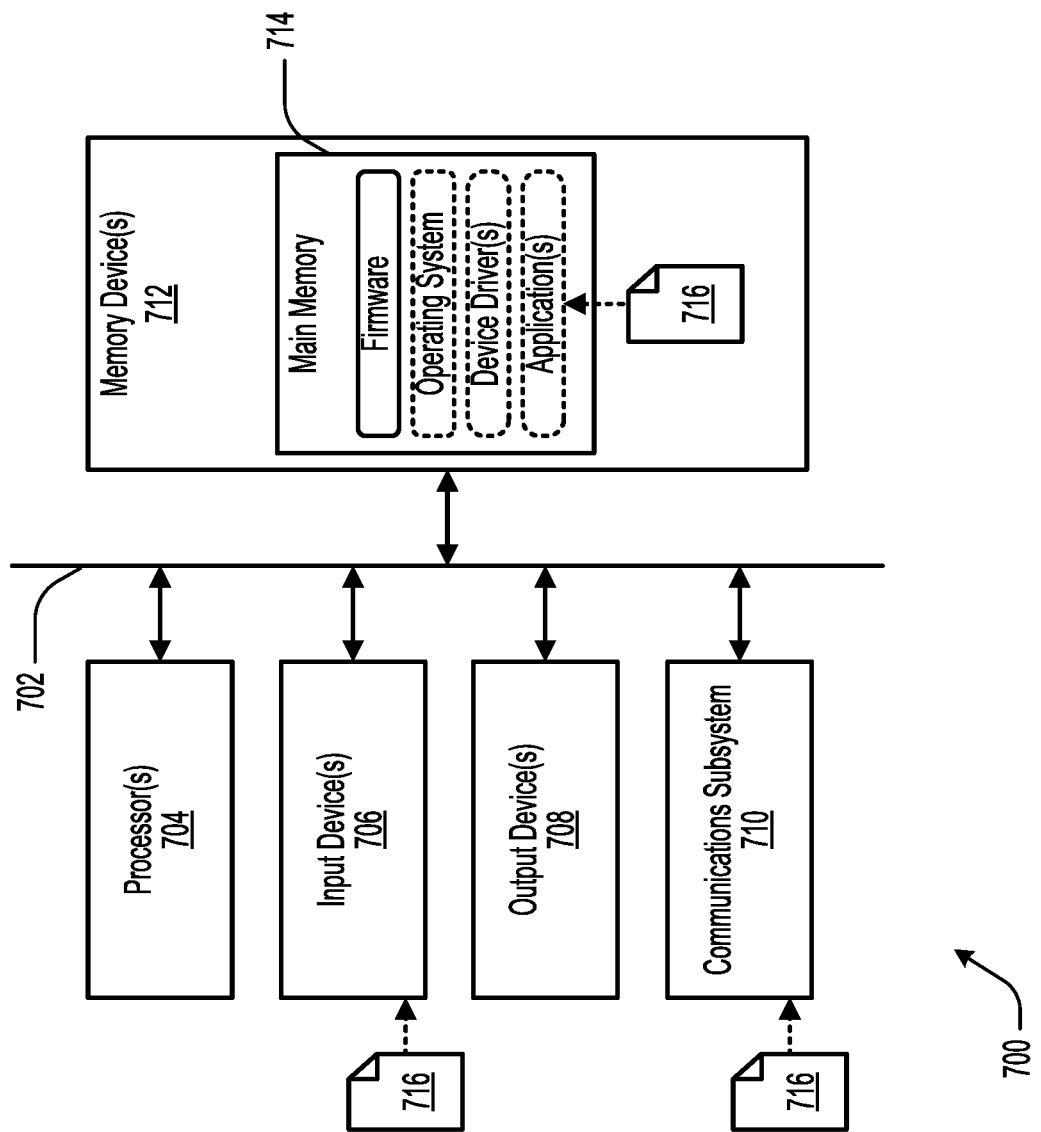
FIG. 7 illustrates an example computer system.

FIG. 7 illustrates an example of a computer system 700 comprising various hardware elements, according to some embodiments. Computer system 700 may be incorporated into or integrated with devices described herein and/or may be configured to perform some or all of the steps of the methods provided by various embodiments. For example, in various embodiments, computer system 700 may be incorporated into initialization modules 202, 302, 402, 502 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device such as an SoC FPGA, among other possibilities.

The various hardware elements of computer system 700 may be coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables, etc.), one or more optical waveguides (e.g., optical fibers, strip waveguides, etc.), one or more wireless connections or links (e.g., infrared wireless communication, radio communication, microwave wireless communication, etc.), among other possibilities.

In some embodiments, communication medium 702 may include one or more buses connecting pins of the hardware elements of computer system 700. For example, communication medium 702 may include a bus connecting processor(s) 704 with main memory 714, referred to as a system bus, and a bus connecting main memory 714 with input device(s) 706 or output device(s) 708, referred to as an expansion bus. The system bus may consist of several elements, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 704 may include one or more multi-core processors, in which each core may read and execute program instructions simultaneously with the other cores.

Input device(s) 706 may include one or more of various user input devices such as a mouse, a keyboard, a microphone, etc., as well as various sensor input devices, such as an image capture device, a pressure sensor (e.g., barometer, tactile sensor, etc.), a temperature sensor (e.g., thermometer, thermocouple, thermistor, etc.), a movement sensor (e.g., accelerometer, gyroscope, tilt sensor, etc.), a light sensor (e.g., photodiode, photodetector, charge-coupled device, etc.), and/or the like. Input device(s) 706 may also include devices for reading and/or receiving removable storage devices or other removable media. Such removable media may include optical discs (e.g., Blu-ray discs, DVDs, CDs, etc.), memory cards (e.g., CompactFlash card, Secure Digital (SD) card, Memory Stick, etc.), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, etc., and may be provided with control signals by computer system 700.

Communications subsystem 710 may include hardware components for connecting computer system 700 to systems or devices that are located external computer system 700, such as over a computer network. In various embodiments, communications subsystem 710 may include a wired communication device coupled to one or more input/output ports (e.g., a universal asynchronous receiver-transmitter (UART), etc.), an optical communication device (e.g., an optical modem, etc.), an infrared communication device, a radio communication device (e.g., a wireless network interface controller, a BLUETOOTH® device, an IEEE 802.11 device, a Wi-Fi device, a Wi-Max device, a cellular device, etc.), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2, etc.), to medium response time and medium capacity memory, such as random access memory, to lower response times and lower capacity memory, such as solid state drives and hard drive disks. While processor(s) 704 and memory device(s) 712 are illustrated as being separate elements, it should be understood that processor(s) 704 may include varying levels of on-processor memory such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as random-access memory (RAM), such as dynamic RAM (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 716 executable by computer system 700. In one example, such instructions 716 may be received by computer system 700 using communications subsystem 710 (e.g., via a wireless or wired signal carrying instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 700. For example, the non-transitory computer-readable medium may be one of memory device(s) 712, as shown in FIG. 7 with instructions 716 being stored within memory device(s) 712. In some cases, the non-transitory computer-readable medium may be separate from computer system 700. In one example, the non-transitory computer-readable medium may a removable media provided to input device(s) 706, such as those described in reference to input device(s) 706, as shown in FIG. 7 with instructions 716 being provided to input device(s) 706. In another example, the non-transitory computer-readable medium may a component of a remote electronic device, such as a mobile phone, that may wirelessly transmit a data signal carrying instructions 716 to computer system 700 using communications subsystem 716, as shown in FIG. 7 with instructions 716 being provided to communications subsystem 710.

Instructions 716 may take any suitable form to be read and/or executed by computer system 700. For example, instructions 716 may be source code (written in a human-readable programming language such as Java, C, C++, C#, Python, etc.), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of performing an initialization process for a set of field of view (FOV) sensors using a set of initialization modules attachable to or integrated with the set of FOV sensors, the method comprising:
   detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors;
   detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor;
   determining, at the first initialization module or the second initialization module, whether a placement of the second initialization module with respect to the first initialization module is acceptable based on the vertical distance and the inter-module distance;
   generating, at the first initialization module or the second initialization module, a feedback signal indicating whether the placement is acceptable; and
   outputting, at the first initialization module or the second initialization module, the feedback signal.

2. The method of claim 1, further comprising:
   determining that a start condition associated with the initialization process is satisfied.

3. The method of claim 2, wherein the start condition is that one or both of the first initialization module and the second initialization module has been powered on.

4. The method of claim 2, wherein the start condition is that one or both of the first initialization module and the second initialization module has received a user input.

5. The method of claim 1, wherein the set of initialization modules are attachable to the set of FOV sensors.

6. The method of claim 1, wherein the set of initialization modules are integrated with the set of FOV sensors.

7. The method of claim 1, wherein the set of FOV sensors are unpowered while the vertical distance and the inter-module distance are being detected and the feedback signal is being outputted.

8. A non-transitory computer-readable medium comprising instructions that, when executed by one or more processors, cause the one or more processors to perform operations for performing an initialization process for a set of field of view (FOV) sensors using a set of initialization modules, the operations comprising:
   detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors;
   detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor;
   determining, at the first initialization module or the second initialization module, whether a placement of the second initialization module with respect to the first initialization module is acceptable based on the vertical distance and the inter-module distance;
   generating, at the first initialization module or the second initialization module, a feedback signal indicating whether the placement is acceptable; and
   outputting, at the first initialization module or the second initialization module, the feedback signal.

9. The non-transitory computer-readable medium of claim 8, wherein the operations further comprise:
   determining that a start condition associated with the initialization process is satisfied.

10. The non-transitory computer-readable medium of claim 9, wherein the start condition is that one or both of the first initialization module and the second initialization module has been powered on.

11. The non-transitory computer-readable medium of claim 9, wherein the start condition is that one or both of the first initialization module and the second initialization module has received a user input.

12. The non-transitory computer-readable medium of claim 8, wherein the set of initialization modules are attachable to the set of FOV sensors.

13. The non-transitory computer-readable medium of claim 8, wherein the set of initialization modules are integrated with the set of FOV sensors.

14. The non-transitory computer-readable medium of claim 8, wherein the set of FOV sensors are unpowered while the vertical distance and the inter-module distance are being detected and the feedback signal is being outputted.

15. A system comprising:
   one or more processors; and
   a computer-readable medium comprising instructions that, when executed by the one or more processors, cause the one or more processors to perform operations for performing an initialization process for a set of field of view (FOV) sensors using a set of initialization modules, the operations comprising:

detecting, using a vertical distance sensor of a first initialization module or a second initialization module of the set of initialization modules, a vertical distance associated with the set of FOV sensors while the first initialization module is attached to or integrated with a first FOV sensor of the set of FOV sensors or the second initialization module is attached to or integrated with a second FOV sensor of the set of FOV sensors;

detecting, using an inter-module distance sensor of the first initialization module or the second initialization module, an inter-module distance between the first initialization module and the second initialization module while the first initialization module is attached to or integrated with the first FOV sensor and the second initialization module is attached to or integrated with the second FOV sensor;

determining, at the first initialization module or the second initialization module, whether a placement of the second initialization module with respect to the first initialization module is acceptable based on the vertical distance and the inter-module distance;

generating, at the first initialization module or the second initialization module, a feedback signal indicating whether the placement is acceptable; and outputting, at the first initialization module or the second initialization module, the feedback signal.

16. The system of claim 15, wherein the operations further comprise:
determining that a start condition associated with the initialization process is satisfied.

17. The system of claim 16, wherein the start condition is that one or both of the first initialization module and the second initialization module has been powered on.

18. The system of claim 16, wherein the start condition is that one or both of the first initialization module and the second initialization module has received a user input.

19. The system of claim 15, wherein the set of initialization modules are attachable to the set of FOV sensors.

20. The system of claim 15, wherein the set of initialization modules are integrated with the set of FOV sensors.

* * * * *